Oct. 29, 1935.  J. BERGESEN, SR  2,019,244
VALVE
Filed Aug. 2, 1934   2 Sheets-Sheet 2

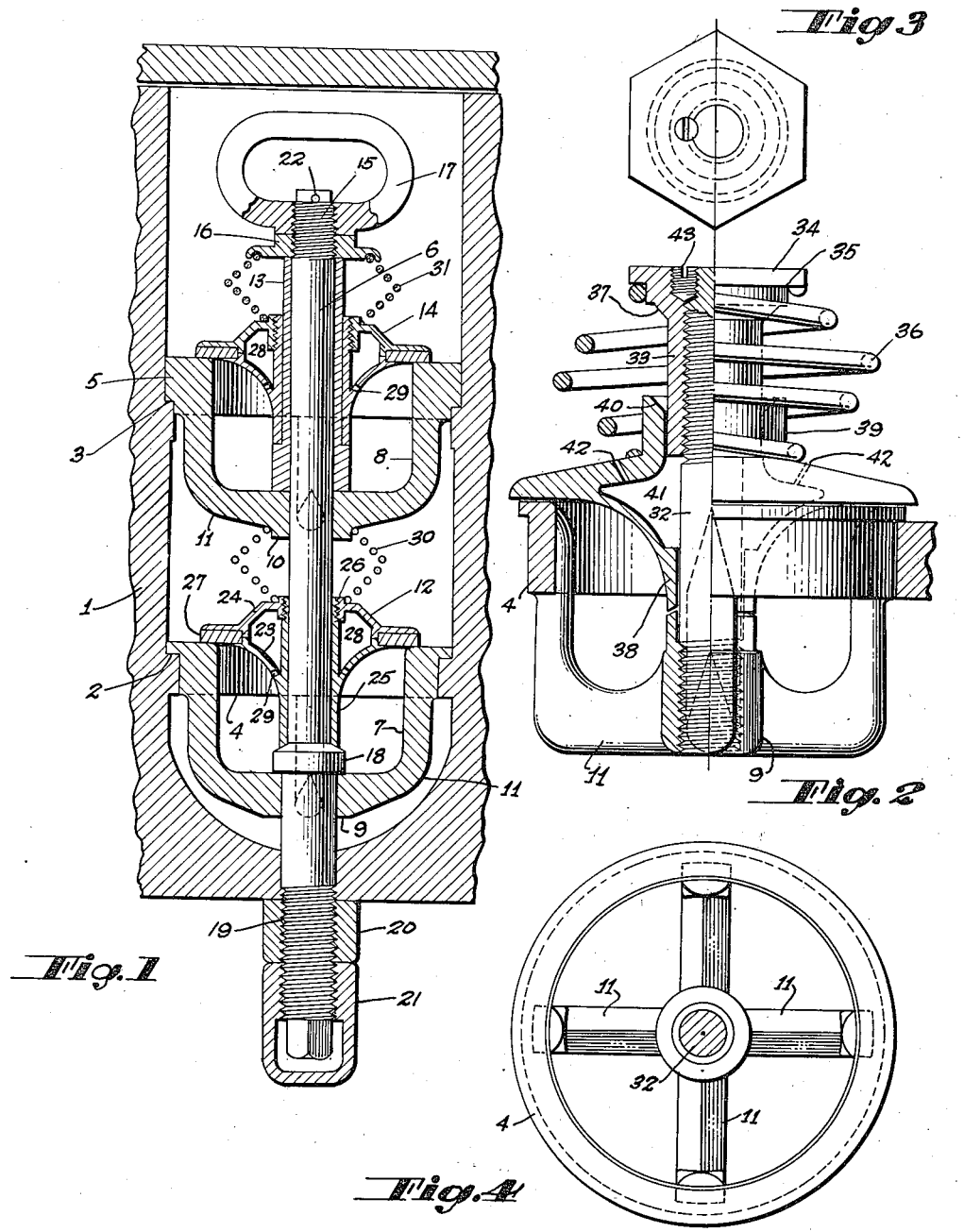

INVENTOR.
John Bergesen Sr.
BY
Cornelius Zabriskie
ATTORNEY.

Patented Oct. 29, 1935

2,019,244

UNITED STATES PATENT OFFICE 2,019,244

VALVE

John Bergesen, Sr., Brooklyn, N. Y.

Application August 2, 1934, Serial No. 738,053

18 Claims. (Cl. 277—70)

This invention relates to valves and is directed more particularly to those types of valves intended for use in connection with reciprocating plunger or piston pumps for the pumping of fluids in either liquid or gaseous form.

As it is well understood in this art, reciprocating pumps are generally provided with one or more inlet valves and one or more outlet valves positioned in appropriate valve chambers and so organized that when the piston moves on the suction stroke, fluid is drawn in through the inlet valve, while the outlet valve remains closed. At the end of the suction stroke of the piston, the inlet valve closes and upon forward movement of the piston, fluid is placed under pressure and forced to lift the outlet valve to thereby exit from the cylinder. This general type of construction has long been employed and is standard. Great difficulty has been experienced, however, in the operation of valves in this connection due to the inherent tendency of the fluid, and particularly the liquid, in passing through inlet and outlet ports to effect a tilting or canting action on the valves. The ports and associated ducts of the valve housing must necessarily change direction in order to obtain a compact arrangement and consequently there is a swirling action with accompanying eddies in all prior structures which tend to force the valves off of their seats in an unequal fashion. In other words, liquids act upon the valve seats in an ununiform way around their peripheries, so as not to give a direct axial lifting moment but rather a tilting force. This results, in time, in undue wear on the valves and guides with resulting chattering of the valve or failure to properly seat.

Not infrequently when this condition becomes pronounced, there is a marked tendency to breakage of the valve or valve stem or lifting of the valve seat from its anchorage. These disadvantages in valves of the character specified are well recognized in the art and numerous attempts have been made to overcome them as they frequently necessitate the shutting down of the pump to permit of repairs and replacements. Nevertheless, so far as I am aware, there has never been produced a valve for the use described and which is free from the objections to which I have referred.

The object of the present invention is to provide a valve which will be free from these objections; one which will be so guided that a straight lift must be absolutely assured and canting precluded; one which will give maximum and wholly sufficient port opening without excessive lift; one wherein the structure will be relatively light and quick acting and at the same time will be so guided as to travel in a predetermined manner on a guide adequate under all conditions; one wherein the production of swirls or eddies, which slow up the flow and interfere with the proper function of the apparatus, is minimized by the inherent structure of the parts; and one which will be particularly active in its operation.

An important feature of this invention, among others, is the construction of the valve in such manner that when used either singly or in tandem, the valves individually or with their associated seats may be quickly and readily replaced in the event of damage thereto or for any other purpose. This feature of the invention particularly recommends itself to structures employing inlet and outlet valves in tandem wherein the valves are placed in alinement, so as to permit each pair of valves to be handled as a unit in a simple and expeditious way.

Another important feature of the invention is the utilization in a valve of the type described of a double action cushion incorporated in the structure in such manner as to prevent hammer blow action of the valves in either direction of their operation and I may use either independently or together with this feature flotation chambers incorporated in the valve body in such manner as to lend buoyancy to the valve and render the same more quickly acting.

A further and important practical feature of this invention, as will be hereinafter manifest, is the elimination from the orifice of the valve seat of all guiding mechanism except the axial valve post. I am able to accomplish this result by mounting the post to the valve upon an underslung spider, so arranged as to be removed from the seat orifice and so shaped as to present a streamlined effect to the passage of liquids and to thereby minimize the formation of eddies or disturbing currents.

The present invention also provides for the housing of the spring, which normally seats the valve, within the valve body in such manner to remove it from the flow of liquid through the valve and to house and conceal it in such a way as to preclude damage to this part.

Features of the invention, other than those specified, will be apparent from the hereinafter detailed description and claims when read in conjunction with the accompanying drawings.

The accompanying drawings illustrate different practical embodiments of the invention, but the constructions therein shown are to be understood as illustrative, only, and not as defining the limits of the invention.

Figure 1 is a central section through a valve casing of a reciprocating pump showing in central section valve structures arranged in tandem and embodying the present invention.

Figure 2 shows a separate individual valve and seat therefor, the same being shown half in central section and half in elevation.

Figure 3 is a top plan view of the valve guide shown in Figure 2.

Figure 4 is a top plan view of the valve seat shown in Figure 2 with the valve removed.

Figure 5:
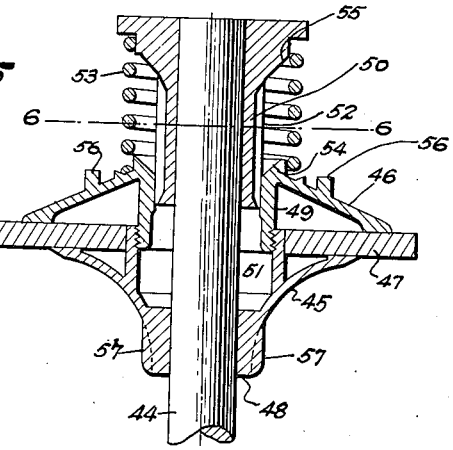
Figure 5 is a central section of a modified form of valve and guide embodying the present invention.

Referring first to Figure 1 of the drawings, 1 designates the valve casing of a reciprocating pump wherein suction and exhaust valves are arranged in axial alinement. In such a situation, the arrangement according to my invention as shown in Figure 1 is highly desirable.

By reference to this figure, it will be noted that the casing 1 is provided with two steps 2 and 3 on which the seat rings of suction and exhaust valves are adapted to rest. These seat rings are arranged in axial alinement one above the other. With this organization of the parts, I mount on each of these steps a valve seat ring. The valve seat ring 4 for the suction valve is offset, so as to seat upon the step 2 and extend downwardly into the cylindrical portion of the casing directly below said step in a manner to form a liquid tight seat therewith which may be ground if desired. The exhaust valve seat ring 5 is similarly adapted to engage with the step 3, so that these two seat rings 4 and 5 are arranged above one another in axial alinement. If desired, the seat rings 4 and 5 may have a tight forced fit with the casing, so that when forced into position, they will remain against inadvertent displacement, and with each of these seat rings may be associated a separate and independent valve guide with an appropriate valve thereon. In this particular relation, however, I find it especially desirable in the interest of economy in manufacture and maintenance costs, to associate with the seat ring valves having a common guide post which also serves as an anchorage for the seat rings with respect to the casing. Such a post is indicated at 6 in Figure 1. It passes coaxial downward through both seat rings and is properly spaced radially with respect thereto by means of underslung hangers. The hanger 7 is integral with the seat ring 4, while the hanger 8 is integral with the seat ring 5. They are preferably cast integral with the seat rings so as to depend an appreciable distance below the same, so that their hubs 9 and 10, respectively, are appreciably removed from the course of liquid through the seat ring. The hubs 9 and 10 closely embrace the post 6, while the arms 11 which secure the hubs of the hangers to the rings are made of oval or streamline cross section, thus affording minimum resistance to the passage of liquid thereabout. The suction valve, indicated generally by the reference character 12, is guided directly on the post 6, while the outlet valve 14 is guided on a sleeve 13 which encircles the post and rests upon the top of the hub 10. The top of the post 6 is threaded at 15 to receive a spring retainer 16 and a lock nut 17, the latter of which is made in the form of a handle, so as to permit the assembly to be readily picked up as a unit. The post 6 is also provided directly above the hub 9 of the lower hanger with a fixed collar 18, while the lower end of the post is threaded at 19 to receive a retaining nut 20 and a lock nut 21. In assembling the parts, the top plate or cover of the casing is removed and the post with valves and seat rings thereon, but without the nuts 20 and 21, is lowered into the casing until the lower threaded nut 19 of the post extends through the bottom of the casing as shown. The nut 20 is then screwed upon the part 19 and tightened, this operation serving to pull down the post until the fixed collar 18 forces the lower valve seat ring 4 to its seat 2. The lock nut 21 is then applied.

During this operation, the spring retainer 16 and handle 17 are preferably left in slightly loosened condition, but as soon as the lower valve seat is properly seated in position the spring retainer 16 may by means of a suitable wrench be screwed down tightly upon the sleeve 13 to force down the hub 10 of the upper valve seat until the latter is properly seated on the shoulder 3. The handle 17 is then screwed down tightly to lock the parts in position and a cotter pin may be passed through the hole 22, so that these parts cannot possibly become loosened. To remove the valves and their seats as a unit, it is only necessary to remove the bolts 20 and 21 and lift out the whole assembly.

The valves 12 and 14 shown in Figure 1 are of the same construction. They are two part valves. Each embodies a lower section 23 and an upper section 24. These sections are complementarily conical shape and each has a hub. The hub 25 of the lower section is made long so as to have an extensive bearing on the post 6 or sleeve 13 as the case may be, and the upper end of the hub 25 is threaded to screw into the interiorly threaded hub 26 of the upper section 24. When the upper and lower sections 23 and 24 are screwed together, they serve to clamp between them a gasket 27 adapted for direct cooperation with the seat rings 4 or 5. This gasket may be of fibre or any other suitable material either metallic or non-metallic or a combination thereof as may be desired. When the valve sections are clamped together, however, there is formed interiorly of each valve a closed chamber 28 which I term a buoyancy chamber.

In Figure 1 the buoyancy chambers are shown as vented by vent holes 29 near the base of each of them, so that air or gases entering into said chambers will be trapped therein and serve to render the valves buoyant for the purpose of making them lighter and quicker in operation. The suction valve 12 is normally held seated by a spring 30 interposed between said valve 12 and the hanger of the upper valve seat, while a spring 31 is interposed between the spring retainer 16 and the upper valve to normally hold it to its seat. Springs of the character shown are employed to give maximum resiliency in minimum dimensions.

I call particular attention to the compact arrangement of parts shown in Figure 1, and the relatively unrestricted port opening which results when the valves or either of them is lifted from its seat. The conical formation of the bottom section of each valve formed as it is on a sweeping curve extending from the hub to and merging into the under surface of the gasket 27 serves to direct a smooth and even flow of the liquid through the valve, while the formation of the arms 11 with streamline cross section, as shown in dotted lines in this figure, causes them to exert minimum retardation or disturbing influence upon the flow of liquid through the valve. I am thus able to obtain not only the relatively large port opening, but one so constituted as to minimize eddies or other disturbances in the flow.

While the structure which I have shown in Figure 1 is that preferred, where circumstances will permit its use, the underlying conceptions of this invention may partake of other forms particularly when the valves are used singularly and not in tandem. Such an arrangement for example is shown in Figures 2 and 3.

Here a valve seat ring 4 is provided with an underslung hanger or spider comprising arms 11 merging into an appropriate hub 9 interiorly threaded to receive a valve post 32 which is thus firmly anchored with respect to and coaxial with the seat ring 4 and extends upwardly above the upper surface of sad seat ring and is threaded to receive a spring retaining sleeve 33. The sleeve 33 has an enlarged head 34 providing a shoulder 35 in engagement with a spring 36 and below the same a frusto conical portion 37. The valve may be made of upper and lower sections if desired, but is here shown as formed in a single casting, the lower portion having a hub 38 guided directly on the post 32 and the upper portion having a hub 39 guided on the sleeve 33. The top of the hub is provided with a frusto conical recess 40 complementary to the frusto conical part 37 of the sleeve, so that as the valve is lifted to its fullest extent, these parts will come into cooperative relation. It will also be noted that the top of the hub 9 of the hanger and the bottom of the valve hub 38 are similarly formed.

The valve is hollow to provide a chamber 41, but is vented as shown at 42. With this arrangement, the chamber 41 of the valve will normally be filled with a liquid or fluid on which the pump is operating. Thus, when the valve is elevated from the seat, the sleeve 33 will act as a plunger or piston with respect to the valve and serve to compress fluid in the chamber 41 with the result that the valve is cushioned and will not knock. Excess pressure is relieved from the chamber 41 through the vents 42 and as the valve closes or comes again to its seat, it is cushioned by the suction action produced in the chamber 41, the same being relieved through vents 42, so that the valve is cushioned in both directions. The cushioning effect to which I have referred, as well as the tension on the spring 36, may be adjusted by rotating the sleeve 33 with respect to the post 32, and the parts may be locked in position by the locking screw 43. In using this valve as shown, its seat ring 4 is secured to the valve casing as by forced fit, although this construction may be used with a slight modification in an arrangement such as shown in Figure 1, as will be apparent to those skilled in the art.

The structure as shown in Figures 5–10 may be used separately or in tandem as may be desired. This is to be clearly understood from the following description of these structures separately.

Figure 6:
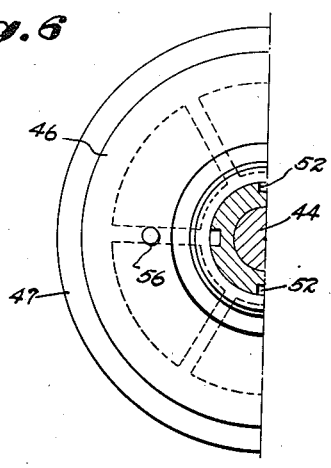
Figure 6 is a section on the line 6—6 of Figure 5 with the spring removed.

In Figures 5 and 6, 44 is the valve post. The valve is shown in two sections, namely, a lower section 45, the hub of which has a screw connection with the upper section 46 with a gasket 47 clamped between them. The hub 48 of the lower section is guided directly on the valve post, while the hub 49 of the upper section is guided upon a sleeve 50 fixed to or adjustable on the post. The interior of the hubs of said sections collectively form a chamber 51, which is closed except for channels 52 extending longitudinally in the exterior of the sleeve 50. A spring 53 normally seats the valve on an appropriate seat ring. When a valve of this kind is in operation, the chamber 51 is filled with the liquid on which the valve is operating, so that as the valve is lifted from its seat liquid in the chamber 51 is compressed and forced out of the chamber 51 through the channels 52 until the valve reaches the utmost of its travel, at which time the frusto conical end 54 of the valve hub 49 engages the frusto conical surface 55 of the sleeve forming therewith a seal against the exit of further fluid and cushionably bringing the valve to rest, so that there can be no knocking.

When the valve is subsequently seated, suction results in the chamber 51 which serves to cushion the valve during its closing movement. The valve 30 is thus cushioned in both directions, so that knocking or shock is precluded at either terminus of its travel. The extensions 56 are for the engagement of a spanner wrench and the same is true of the ribs 57, these parts facilitating the assembling or dismantling of the valve sections.

Figure 7:
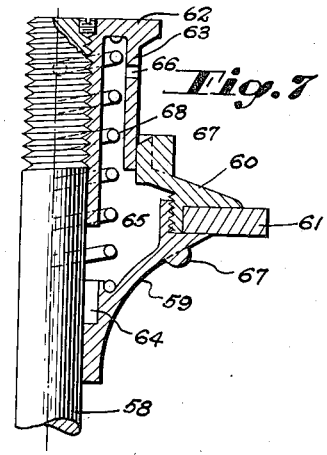
Figure 7 is a lateral half section of a modified form of valve construction.
Figure 8:
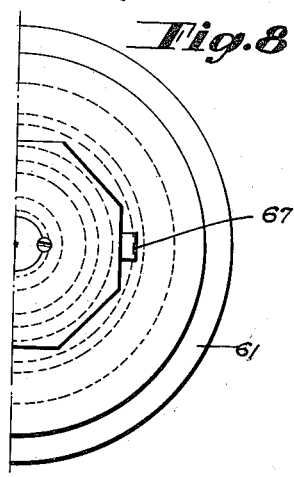
Figure 8 is a plan view of the structure of Figure 7.

In the structure shown in Figures 7 and 8, the valve post is indicated at 58. The lower and upper sections 59 and 60 of the valve are screwed together on an interposed gasket 61. A sleeve 62 is provided with an axially spaced apron 63 having a close sliding fit with the hub of the upper valve section, while the hub of the lower valve section is guided directly on the post 58, but is provided therein with an annular pocket 64 adapted to receive, as the valve is fully opened, the lower end of the sleeve 62 to produce a dash pot effect. As the valve is opened, liquid within chamber 65 is compressed and exhausted through vent 66 to cushion the opening movement of the valve until the valve is almost fully opened. Sleeve 62 thereupon enters pocket 64 as a piston and cooperates therewith as a dash pot to bring the valve to rest without shock or vibration. When the valve closes, suction in the chamber 65 cushions its closing movement. The ribs 67 are for cooperation with a spanner wrench to facilitate assembly and dismantling of the valve. An important feature of the structure of Figure 7 is that the valve spring 68 is wholly concealed and housed within the valve.

Figure 9:
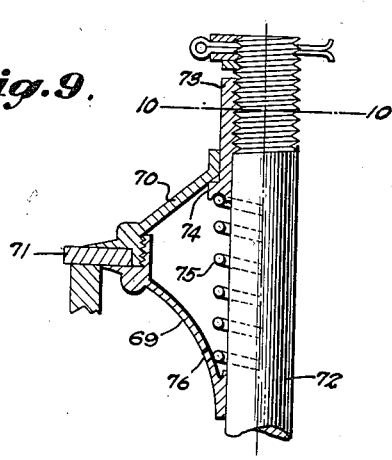
Figure 9 shows one lateral half section of a further modified form of valve construction embodying this invention.
Figure 10:
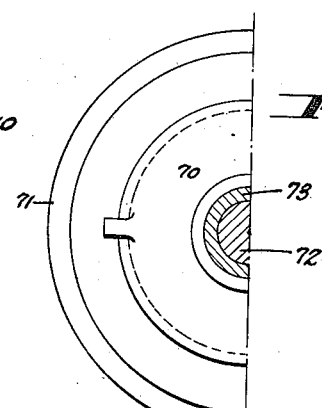
Figure 10 is a section on the line 10—10 of Figure 9.

Another method of accomplishing this result is shown in Figures 9 and 10. In these figures, the valve is made with upper and lower sections 69 and 70 together with an interposed gasket 71. The hub of the lower section is guided directly on the valve post 72, while the hub of the upper section is guided on a sleeve 73, the lower end of which is flanged outwardly at 74, so that a spring 75 may act between this sleeve and the valve to normally seat the valve. Vents 76 in the lower valve section cause the hollow interior of the valve to serve as a buoyancy chamber. It may be noted in this connection that if the vents are in the lower section of the valve, the valve will serve to trap gaseous fluids therein and function as a buoyancy chamber as in Figure 1, but if the vents are in the upper section, this chamber will not function as a buoyancy chamber but in several of the structures which I have described, such vents will enter into the cushioning organization of the parts.

In all of the structures which I have described and which have been therein shown for the purpose of illustrating the principles of this invention, there is present a long guiding surface for the valves which preclude canting of the valves. This long and extensive guide is accomplished without anywise constricting the port areas of such valves, and furthermore streamlining of the underslung hanger or spider is such in every case as not to materially deform the course of liquids as they flow through the valve.

Flotation chambers render the valves relatively light when desired, while a thorough cushioning of the valves against knocking or vibration is assured in the structures which I have described. From a practical standpoint, moreover, the gaskets when employed are reversible so that if one set becomes worn or wire drawn, these gaskets may be reversed in a simple and efficient manner. In all cases, the valve is so constructed that it will wear even. It is free to turn upon its post and with reference to its seat and will have a true lift under both suction and pressure with no tendency to tilt.

In accordance with this invention, I prefer to mount the post rigid with the seat ring as shown, so that when either of these parts is firmly secured in position, the other part will be likewise held in place. The seat ring with the spider or hanger may have a forced fit or be locked in place in any suitable way or, as stated, may be bolted down or held in place by the post.

It will be clear from the foregoing detailed description that the valve of this invention thus embodies what may be generally termed a suitable seat ring having rigid therewith the spider or hanger which includes a hub coaxial with the seat ring and spaced axially therefrom by streamlined arms rigid with both the hub and seat ring. In the hub is supported the guide post of the valve in a manner to project through the seat ring coaxially therewith, while the lift valve, which may be properly designated as the sealing element or member of the valve, is guided for this lifting movement on the post, either directly or through an interposed sleeve or both. This so-called sealing member may, as hereinbefore stated, be made hollow to form a buoyancy chamber or a cushion chamber or both, as has been fully explained, and the so-called gasket which in some cases is embodied in the construction and is in the form of an annular disk serves to properly cooperate with the seat to form a tight joint and is readily reversible or replaceable by merely separating the sections of the sealing element.

In practice, the sealing element may be made heavier than the material which it controls and may include the buoyancy chamber to which I have referred, so as to materially lighten it and cause it to be quick acting. It may, if desired, however, be made quite light and when used with a buoyancy chamber will be especially active and quick acting. While it is not essential to the proper operation of this valve, I find it desirable in some cases to make the diameter of the sealing element sufficiently large so that it extends beyond the valve seat. With this arrangement, a liquid flowing up through the valve opening will have a greater tendency to lift the valve against the tension of its spring and to hold it open and give maximum port opening during the flow of liquid pressure.

The foregoing detailed description sets forth several practical illustrations of the invention, but the invention is to be understood as commensurate with the appended claims.

Having thus fully described the invention, what I claim as new and desire to secure by Letters Patent is:

1. A valve comprising a seat ring, a spider including a hub and arms rigid with the hub and the seat ring to position the hub coaxially of the ring and in axially spaced distance therefrom, said arms having streamlined cross section to present a minimum resistance to the flow of fluid through the opening in the seat ring, a guide post rigid with the hub and extending through the seat ring in coaxial relation thereto, and a sealing member having an annular seating face and provided with spaced apart hubs positioned, respectively, above and below the seating face of the sealing member and guided for rectilinear movement on said guide post, said sealing member being sealed against the passage of liquid therethrough.

2. A valve comprising a seat ring, a spider including a hub and arms rigid with the hub and the seat ring to position the hub coaxially of the ring and in axially spaced distance therefrom, a guide post rigid with the hub and extending through the seat ring in coaxial relation thereto, and a sealing member comprising oppositely disposed substantially conical hollow sections and provided at the apex of each conical section with a hub embracing the post to guide the sealing member for rectilinear movement on the post.

3. A valve comprising a seat ring, a spider including a hub and arms rigid with the hub and the seat ring to position the hub coaxially of the ring and in axially spaced distance therefrom, a guide post rigid with the hub and extending through the seat ring in coaxial relation thereto, and a sealing member comprising oppositely disposed substantially conical sections and provided at the apex of each conical section with a hub embracing the post to guide the sealing member for rectilinear movement on the post, said sealing member being hollow to provide therein a chamber vented to the interior of the valve.

4. A valve comprising a seat ring, an underslung hanger rigid with said ring, a guide post rigid with the hanger and arranged coaxially of the seat ring, and a hollow sealing member having therein a substantially closed chamber and guided for rectilinear movement on the valve post above and below the seat ring and provided with a sealing face, the chamber of the sealing member having a hole in the wall thereof at the under side of the sealing member and below the sealing face thereof whereby the chamber of the sealing member is adapted to function as a buoyancy chamber during operation of the valve.

5. A valve comprising a casing having therein a suitable seat, a guide post extending through and coaxial with the seat, a piston element normally stationary on the post, a sealing member guided for rectilinear movement on the post and on the piston member, whereby the piston member is caused to project a greater distance into the sealing member when the latter is moved from the valve seat, there being a pressure relief vent to permit the passage of fluid into and out of the hollow interior of the sealing member as the latter moves with respect to the piston member to cushion the sealing member during its operation, and dash pot elements formed respectively upon the piston member and sealing member to further cushion the operations of the latter.

6. A valve comprising a casing having therein a suitable seat, a guide post extending through and coaxial with the seat, a piston element normally stationary on the post, a sealing member guided for rectilinear movement on the post and on the piston member, whereby the piston member is caused to project a greater distance into the sealing member when the latter is moved from the valve seat, there being a pressure relief vent to permit the passage of fluid into and out of the hollow interior of the sealing member as the latter moves with respect to the piston member to cushion the sealing member during its operation, dash pot elements formed respectively upon the piston member and sealing member to further cushion the operations of the latter, and a spring for normally seating the sealing member upon the valve seat, said spring being housed within the sealing member and piston member collectively.

7. A valve comprising a casing having an annular valve seat, an underslung hanger associated with said seat and having a hub coaxial with and spaced axially from said seat, a guide post rigid with said hub and extending through and coaxial with said seat, and a sealing member guided for rectilinear movement on said post, said sealing member comprising oppositely disposed hollow conical sections threaded at their bases to one another to secure them together and provided with opposing flanges, and a sealing disk to cooperate with said seat, said sealing disk being positioned between said flanges and clamped in place thereby.

8. A valve comprising a seat ring, a hub coaxial with the seat ring and spaced axially therefrom, arms rigid with the hub and seat ring to rigidly mount the latter on the former, a guide post rigid with the hub and extending through the seat ring in coaxial relation to the latter, a piston member mounted on the post on the opposite side of the seat ring from said hub, and a sealing member collectively guided for rectilinear movement on the post on one side of the seat ring and by the piston member on the opposite side of the seat ring, a sealing member being hollow and vented to permit of equalization of pressure during operations of the sealing member for the purpose of cushioning such operations, and a spring for normally seating the sealing element on the seat ring.

9. A valve comprising a valve casing having therein a pair of axially spaced apart coaxial ledges, a seat ring resting on each ledge, and each of which seat rings is provided with an underslung hanger, a common guide post extending coaxially through the seat rings and through the bottom of the valve casing, pressure members on said guide post above each hanger, a nut screwed on to the lower end of the guide post exteriorly of the valve casing to draw said post downwardly to draw both seat rings into tight engagement with their respective ledges, and a sealing member cooperating with each of said seat rings, both sealing members being guided for rectilinear movement on the common guide post.

10. A tandem valve unit comprising a guide and anchoring post threaded at its opposite ends to receive adjusting and anchoring nuts, a plurality of seat rings arranged longitudinally of the post and each provided with a spider having a hub embracing the post to maintain coaxial relation between the rings and the post, and a sealing member guided on the post adjacent each seat ring.

11. A tandem valve unit comprising a guide and anchoring post threaded at its opposite ends to receive nuts, a plurality of seat rings each provided with an underslung spider having a hub embracing the post to maintain coaxial relation between the rings and the post, a fixed collar engaging the hub of one seat ring, an adjustable collar engaging the hub of the other seat ring, a sealing element embracing the post and guided for rectilinear movement with respect to each seat ring, a spring embracing the post and bearing against each sealing member, a nut a screw on one end of the post to anchor one seat ring with respect to one seat of a valve casing, and a nut to screw on to the other end of the post to anchor the other seat ring with respect to another valve seat of the same casing.

12. A valve comprising a pair of axially spaced apart coaxial seats, a seat ring member associated with each seat, a sealing member cooperating with each seat ring member, and a guide and anchoring post arranged coaxially of said seat ring member and sealing members and having abutments to apply pressure to the seat ring members in the direction of their respective seats to anchor the seat ring member in position and also guide the sealing members for rectilinear movement relative to their respective seat ring members.

13. A valve comprising a casing having therein axially spaced apart coaxial seats, a seat ring member associated with each seat, a sealing member cooperating with each seat ring member, and means arranged coaxially of the seat ring members to simultaneously clamp both of said members rigidly to their seats and also serve to guide the sealing members for movement toward and away from their respective seat ring members.

14. A valve comprising a seat ring, a guide post extending through the seat ring in coaxial relation thereto and rigidly secured to the seat ring at a point axially remote from the ring and at one side thereof, a sleeve longitudinally adjustable on the post at the other side of the seat ring and provided with an annular seat, a hollow sealing member embracing the post and provided at one axial end with a hub bearing on the post and at its other axial end with a hub bearing on the sleeve, said sealing member being provided adjacent the latter hub with a seat adapted to cooperate with the seat of the sleeve to form therewith a seal when the sealing member is in seated relation to the seat ring of the valve.

15. A valve comprising a seat ring, a guide post extending through the seat ring in coaxial relation thereto and rigidly secured to the seat ring at a point axially remote from the ring and at one side thereof, a sleeve longitudinally adjustable on the post at the other side of the seat ring and provided with an annular seat, a hollow sealing member embracing the post and provided at one axial end with a hub bearing on the post and at its other axial end with a hub bearing on the sleeve, said sealing member being provided adjacent the latter hub with a seat adapted to cooperate with the seat of the sleeve to form therewith a seal when the sealing member is in seated relation to the seat ring of the valve, said hollow sealing member being vented on the side remote from the sleeve to permit of equalization of pressures and to promote buoyancy of the sealing member.

16. A valve comprising a seat ring, a guide post extending through the seat ring in coaxial relation thereto and rigidly secured to the seat ring at a point axially remote from the ring and at one side thereof, a sleeve longitudinally adjustable on the post at the other side of the seat ring and provided with an annular seat, a hollow sealing member embracing the post and provided at one axial end with a hub bearing on the post and at its other axial end with a hub bearing on the sleeve, said sealing member being provided adjacent the latter hub with a seat adapted to cooperate with the seat of the sleeve to form therewith a seal when the sealing member is in seated relation to the seat ring of the valve, and a spring encircling the valve post within the hollow sealing member and interposed between the inner end of the sleeve and the remote hub of the sealing member to normally impel said sealing member into engagement with the seat ring.

17. A valve comprising a seat ring, a guide post extending through the seat ring in coaxial relation thereto and rigidly secured to the seat ring at a point axially remote from the ring and at one side thereof, a sleeve longitudinally adjustable on the post at the other side of the seat ring and provided with an annular seat, a hollow sealing member embracing the post and provided at one axial end with a hub bearing on the post and at its other axial end with a hub bearing on the sleeve, said sealing member being provided adjacent the latter hub with a seat adapted to cooperate with the seat of the sleeve to form therewith a seal when the sealing member is in seated relation to the seat ring of the valve, said hollow sealing member being vented on the side remote from the sleeve to permit of equalization of pressures and to promote buoyancy of the sealing member, and a spring acting upon said sealing member in the direction of the seat ring to normally impel the former into engagement with the latter.

18. A valve comprising a valve casing having therein a pair of axially spaced apart coaxial ledges, a seat ring resting on each ledge, and each of which seat rings is provided with a hanger, a common guide post extending coaxially through the several seat rings, pressure members on said guide post above each hanger, means for locking the guide post against longitudinal movement to maintain both seat rings in tight engagement with their respective ledges, and a sealing member cooperating with each of said seat rings, both sealing members being guided for rectilinear movement on the common guide post.

JOHN BERGESEN, Sr.